United States Patent [19]

Weirich et al.

[11] Patent Number: 4,534,584
[45] Date of Patent: Aug. 13, 1985

[54] HYDRAULIC CONNECTING DEVICE

[75] Inventors: Walter Weirich, Dortmund; Jürgen Melis, Lünen; Peter Wollenhaupt, Lünen-Horstmar, all of Fed. Rep. of Germany

[73] Assignee: Gewerkschaft Eisenhutte Westfalia, Lunen, Fed. Rep. of Germany

[21] Appl. No.: 464,258

[22] Filed: Feb. 7, 1983

[30] Foreign Application Priority Data

Feb. 6, 1982 [DE] Fed. Rep. of Germany ....... 3204102

[51] Int. Cl.³ .............................................. F16L 35/00
[52] U.S. Cl. ................... 285/24; 285/137 R; 285/305
[58] Field of Search ...................... 285/137 R, 305, 24

[56]  References Cited
U.S. PATENT DOCUMENTS

| 4,007,951 | 2/1977 | Legris | 285/137 R |
| 4,113,287 | 9/1978 | Bogatirev et al. | 285/137 R |
| 4,319,772 | 3/1982 | Weirich et al. | 285/137 R X |
| 4,367,888 | 1/1983 | Leverberg et al. | 285/137 R X |

FOREIGN PATENT DOCUMENTS

| 302078 | 7/1916 | Fed. Rep. of Germany | 285/137 R |
| 2059576 | 8/1972 | Fed. Rep. of Germany | 285/137 R |
| 1097687 | 1/1968 | United Kingdom | 285/137 R |

Primary Examiner—Dave W. Arola
Attorney, Agent, or Firm—Sughrue, Mion, Zinn, Macpeak & Seas

[57] ABSTRACT

A hydraulic connecting device is disclosed, the device being for interconnecting a multi-line hose and a coupling device. The hose has a plurality of flexible hydraulic conduits bunched together within a protective sheath. The coupling device has a plurality of plug pins held within a casing by a retaining disc. The casing is attached to the protective sheath by the connecting device. The connecting device is constituted by a clamping sleeve, which is connected to the protective sheath, and a connecting sleeve, which is connected to the casing. The two sleeves are telescoped together at end portions thereof and are joined together by means of a rotary connection which resists tensile forces. The rotary connection is constituted by a releasable securing element.

7 Claims, 6 Drawing Figures

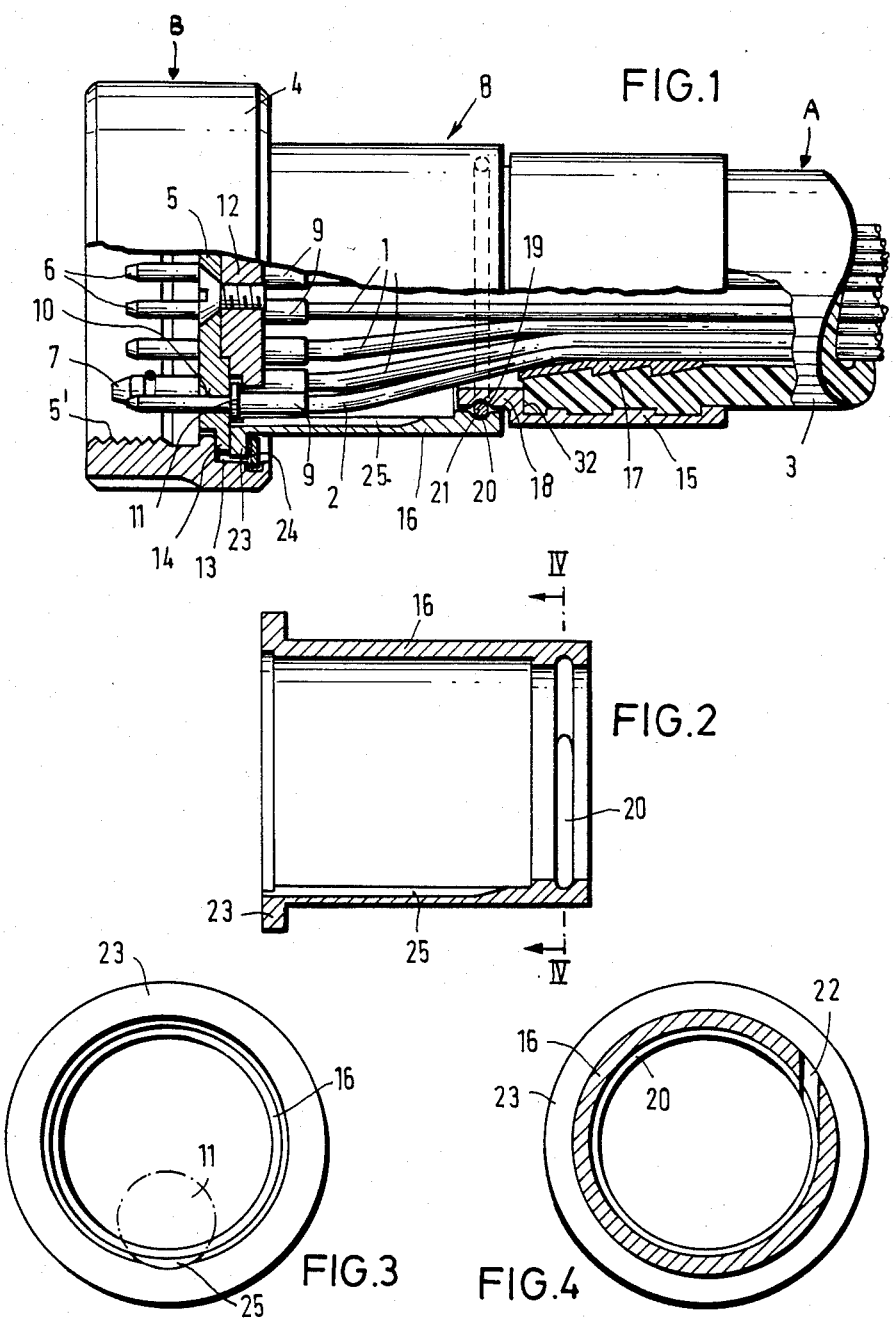

HYDRAULIC CONNECTING DEVICE

BACKGROUND TO THE INVENTION

This invention relates to a hydraulic connecting device for interconnecting a hydraulic multi-line hose and a hydraulic coupling device, the multi-line hose having a plurality of flexible hydraulic conduits housed within a protective sheath, and the coupling device having a plurality of plug pins held within a casing by a retainer. The invention is particularly useful in the hydraulic distribution systems used in underground mine workings, particularly for hydraulic advanceable mine roof support assemblies and other hydraulic appliances. Such hydraulic systems usually use an oil/water emulsion as the hydraulic fluid, but other fluids including air can also be used.

Systems are known in which numerous hydraulic conduits are bunched together to form multi-line hoses. Multi-line hoses are interconnected by means of pairs of complementary hydraulic coupling devices. One coupling device of each pair houses a plurality of male plug pins which are attached to the conduits of one multi-line hose; and the other coupling device of that pair houses a plurality of female plug pins (or sockets) which are attached to the conduits of a second multi-line hose. The female plug pins mate with the male plug pins when the two coupling devices are attached (usually by the interengagement of complementary screw threads on their casings), thereby connecting the two multi-line hoses. The plug pins are, in each case, held within radial slots or circular apertures provided in a retainer mounted in the casing of the coupling device. (See DE-AS No. 2,059 576 and DE-GM No. 79 03535)

With systems of this type, the protective sheath of a given multi-line hose is attached to the casing of its coupling device in such a manner as to resist tensile forces, but so as to be rotatable relative thereto.

The aim of the present invention is to provide an improved connecting device for interconnecting a multi-line hose and a coupling device, which connecting device can resist tensile forces whilst permitting relative rotation between the coupling device and the hose, which can be fitted in a simplified manner, which is as compact as possible, and whose cost of manufacture is as low as possible.

SUMMARY OF THE INVENTION

The present invention provides a hydraulic connecting device for interconnecting a hydraulic multi-line hose and a hydraulic coupling device, the connecting device comprising a first sleeve, a second sleeve having an end portion telescopically associated with an end portion of the first sleeve, and a releasable securing element for detachably connecting said end portions of the sleeves, the other end portion of the first sleeve being adapted to be connected to the multi-line hose, and the other end portion of the second sleeve being adapted to be connected to the coupling device, wherein the securing element is such as to permit relative rotation between the two sleeves and such as to resist tensile forces tending to separate the two sleeves.

Advantageously, said end portion of the first sleeve is positioned within said end portion of the second sleeve, and said end portion of the first sleeve is an inturned end portion.

The two sleeves of this connecting device can be of simple form and of small dimensions. They can be telescoped together during fitting. Moreover, with the aid of a simple securing element, they can be joined together to resist tensile forces while forming a rotary connection.

In a preferred embodiment, the securing element is a wire collar which engages in a groove formed by complementary recesses formed in the telescoped end portions of the sleeves. Advantageously, one of the sleeves is provided with an aperture which is tangential to, and contiguous with, the recess is that sleeve. With the aid of such wire collar it is possible to establish a reliable, low-cost, tensile-force-resisting connection between the two sleeves. Moreover, the sleeves can be of small dimensions. The rotary connection can be easily established; and, if required, it can also be released without difficulty.

Although the use of a wire collar is preferred, the securing element may be a stop member (such as a circlip) detachably secured to the inner surface of said end portion of the second sleeve, the stop member engaging behind an outwardly-extending flange provided on the outer surface of said end portion of the first sleeve.

Advantageously, the second sleeve is provided with a second stop member, the second stop member being positioned within the second sleeve, said outwardly-extending flange of the first sleeve being positioned between the first and second stop members.

Preferably, said end portions of the sleeves have a greater wall-thickness than the remaining portions thereof.

The invention also provides a hydraulic multi-line hose, a hydraulic coupling device, and a hydraulic connecting device interconnecting the multi-line hose and the coupling device, the multi-line hose having a plurality of flexible hydraulic conduits housed within a protective sheath, the coupling device having a plurality of plug pins held within a casing by a retainer, and the connecting device being as defined above.

Preferably, the first sleeve is a clamping sleeve which is press-fitted over the end portion of the protective sheath of the multi-line hose. In this case, said end portion of the first sleeve may extend beyond the protective sheath of the multi-line hose.

Advantageously, said other end portion of the second sleeve is positioned in a recess formed in the casing of the coupling device, and wherein said other end portion of the second sleeve is provided with an outwardly-extending flange which bears against the retainer, and is held thereagainst by an abutment member detachably fixed to the casing. Preferably, the abutment member is a circlip. By releasing the abutment member, the casing of the coupling device can be pulled away from the second sleeve, so that the retainer and the plug pins become accessible.

In a preferred embodiment, the second sleeve has an axially-extending recess formed in its inner wall. This recess is adapted to receive a flange provided on one of the plug pins, said one plug pin being larger than the other plug pin, and serving as an alignment device. This helps to keep the connecting device relatively compact.

The invention further provides a hydraulic connecting device for interconnecting a hydraulic multi-line hose and a hydraulic coupling device, the connecting device comprising a first sleeve, a second sleeve having an end portion telescopically associated with an end portion of the first sleeve, and connection means for detachably connecting said end portions of the sleeves, the other end portion of the first sleeve being adapted to be connected to the multi-line hose, and the other end portion of the second sleeve being adapted to be connected to the coupling device, wherein said connection means is such as to permit relative rotation between the two sleeves and such as to resist tensile forces tending to separate the two sleeves.

Preferably, said end portion of the first sleeve is telescoped within said end portion of the second sleeve, and wherein said end portion of the first sleeve is provided with an outwardly-extending flange which engages behind an inwardly-extending flange provided on said end portion of the second sleeve, said flanges constituting said connection means.

BRIEF DESCRIPTION OF THE DRAWINGS

Three forms of connecting device for connecting a hydraulic multi-line hose to a hydraulic coupling device, and constructed in accordance with the invention, will now be described in detail, by way of example, with reference to the accompanying drawings, in which:

FIG. 1 is an axial cross-section of the first form of connecting device shown interconnecting a multi-line hose and a hydraulic coupling device;

FIG. 2 is an axial cross-section of part of the connecting device of FIG. 1;

FIG. 3 is an end elevation of that part of the first form of connecting device shown in FIG. 2;

FIG. 4 is a cross-section taken on the line IV—IV of FIG. 2; and

DESCRIPTION OF PREFERRED EMBODIMENTS

Figure 5:
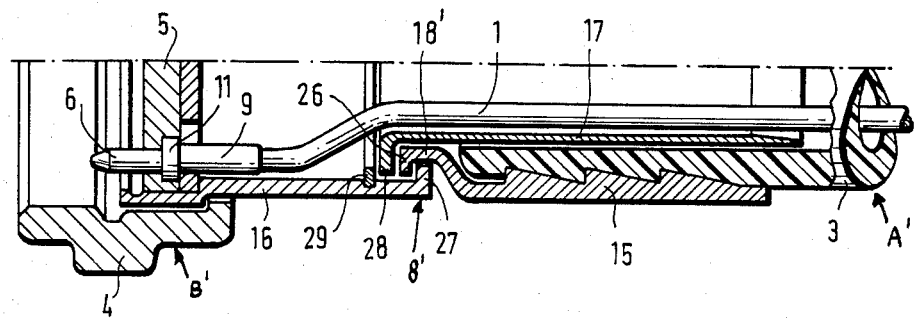
FIGS. 5 and 6 show axial cross-sections of the second and third forms of connecting device, each of which is shown interconnecting a multi-line hose and a hydraulic coupling device.

Referring to the drawings, FIG. 1 shows a multi-line hose A connected to a hydraulic coupling device B by a connecting device 8. The hose A is constituted by a group of flexible conduits (pressure lines) 1 and by a further flexible conduit (return line) 2, all of these conduits forming a bundle inside a flexible protective sheath 3. The conduit 2 has a greater flow cross-section and a larger outside diameter than those of the conduits 1.

The coupling device B comprises a casing 4, a retaining disc 5 arranged within the casing, and a plurality of plug pins 6 and 7 held by the retaining disc 5. The plug pins 6 and 7 are secured to the ends of the individual flexible conduits 1 and 2. The plug pins 6 are connected to the smaller conduits 1, and have a smaller diameter than the plug pin 7 which is connected to the larger diameter conduit 2. The plug pins 6 and 7 are secured, in the known manner, to the ends of the conduits 1 and 2 by means of compressible sleeves 9. The retaining disc 5 is provided with a plurality of apertures 10 which are disposed on a common pitch circle. The apertures 10 receive the plug pins 6 and 7, each of which is provided with a flange 11 which bears against the rear face of the retaining disc 5. In order to secure the plug pins 6 and 7 to the retaining disc 5, there is provided a holder plate 12. The holder plate 12 is releasably attached by a screw-threaded member to the rear face of the retaining disc 5, so as to engage behind the flanges 11 of the plug pins 6 and 7, thereby holding the plug pins in position.

The casing 4 takes the form of a cap screw (box nut), and has an internal screw-threaded portion 5′, whereby it can be connected to a complementary coupling device (not shown), which has sockets for engagement with the plug pins 6 and 7. The plug pin 7 also constitutes an alignment device, and so ensures that the plug pins are correctly connected to their sockets. A machined recess 13 is formed in the rear face of the casing 4, the recess accommodating the retaining disc 5. The retaining disc 5 is provided with an annular flange 14, which bears against the inner end face of the machined recess 13.

The connecting device 8 is constituted by a clamping sleeve 15 and a connecting sleeve 16 attached to the clamping sleeve by a rotary connection. The clamping sleeve 15 surrounds the end portion of the protective sheath 3 of the hose A; and is held, by a press-fit, against the sheath, the sheath being internally braced by a backing sleeve 17 in the known manner. The clamping sleeve 15 has an axial extension 18 which projects beyond the end of the sheath 3. The axial extension 18 is formed by a cylindrical, reduced-diameter portion of the sleeve 15, and is telescoped within the open end of the connecting sleeve 16. A peripheral recess 19 is formed in the cylindrical extension 18, this peripheral recess forming, together with a peripheral recess 20 formed in the cylindrical inner surface of the end of the connecting sleeve 16 that surrounds the extension 18, a groove for accommodating a wire collar 21. The wire collar 21 is introduced into the groove through a tangential opening 22 (see FIG. 4), and establishes a tensile-force-resisting but rotatable connection between the two sleeves 15 and 16.

At its other end, the connecting sleeve 16 has an annular flange 23, which bears against the annular flange 14 of the retaining disc 5. The connecting sleeve 16 is secured to the casing 4 by means of a circlip 24, which is introduced into an annular groove in the cylindrical inner wall of the machined recess 13 in the casing 4. Alternatively, instead of the circlip 24, a stop ring could be introduced into the machined recess 13, the stop ring being screwed into the machined recess, or being releasably secured in said recess by means of a wire collar. When the circlip 24 or the like is released, the casing 4 can be pulled away from the connecting sleeve 16 to separate the coupling device B from the connecting device 8. Similarly, during assembly, the casing 4 can be pushed on to the sleeve 16 to attach the coupling device B to the connecting device 8.

The cylindrical inner wall of the connecting sleeve 16 is formed with an axially-extending, groove-like portion 25 of reduced thickness. As shown best in FIG. 3, the flange 11 of the larger plug pin 7 engages within this reduced-thickness wall portion 25. In this way, the larger plug pin 7 can be accommodated on the common pitch circle together with the plug pins 6 without needing to increase the diameter of either the retaining disc 5 or the connecting sleeve 16. Consequently, there is no need to increase the diameter of the casing 4.

The rear face of the axial extension 18 defines an annular shoulder 32 for supporting the protective sheath 3, which is firmly clamped between the clamping sleeve 15 and the backing sleeve 17. The wall-thickness of the axial extension 18, and of the overlapping end of the connecting sleeve 16, is greater than in their remaining zones, so that no weakening is caused by providing the recesses 19 and 20 in these zones.

FIG. 5 shows the second form of connecting device 8′, which interconnects a multi-line hose A′ and a coupling device B′. The connecting device 8′ is generally similar to the connecting device 8 of FIGS. 1 to 4, and differs therefrom only as regards the form of the clamping sleeve 15' which secures the protective sheath 3 to the casing 4. Accordingly, only this part of the connecting device 8' will be described in detail. The axial, cylindrical extension 18' of the clamping sleeve 15, which extends beyond the end of the protective sheath 3, has an outwardly-extending flange 26. This flange 26 engages behind an inwardly-extending flange 27 provided at the end of the connecting sleeve 16, so that a rotary connection, which resists tensile force, is established between the two sleeves 15 and 16. The backing sleeve 17, which braces the protective sheath 3 from within, is provided with an annular flange 28. This flange 28 is disposed between the flange 26 and a circlip 29 secured to the inner wall of the sleeve 16, whereby the position of the backing sleeve 17 is fixed.

Figure 6:
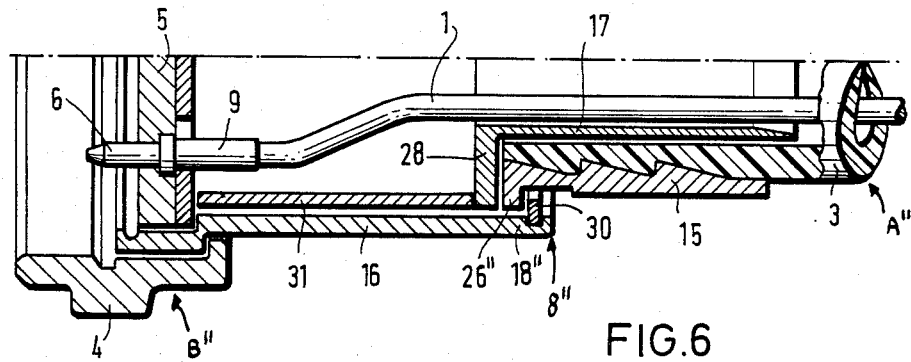

FIG. 6 shows the third form of connecting sleeve 8" which interconnects a multi-line hose A" and a coupling device B". Here again, the connecting device 8" is generally similar to the connecting device 8 of FIGS. 1 to 4, and so only the modified parts will be described in detail. The clamping sleeve 15 of the connecting device 8" does not have a portion extending axially beyond the end of the protective sheath 3. Instead, the connecting sleeve 16 is provided with an axial extension 18", which is telescoped around the end portion of the clamping sleeve 15. An outwardly-extending flange 26" is provided at this end of the clamping sleeve 15, the flange 26" engaging behind a circlip 30 provided on the extension 18". The circlip 30 is releasably attached to the extension 18". Alternatively, a stop ring may be used instead of the circlip 30. For example, the stop ring may be constituted by an inwardly-extending flange similar to the flange 27 shown in FIG. 5. It would also be possible to provide the stop ring with screw threads, so that it would be screwed into the extension 18". Instead of the circlip 29 of the FIG. 5 embodiment, the connecting device 8" of FIG. 6 has a stop sleeve 31. This stop sleeve 31 is inserted into the connecting sleeve 16, and is braced directly (or indirectly) against the retaining disc 5. The flange 28 of the backing ring 17 lies between the stop sleeve 31 and the end of the clamping sleeve 15.

We claim:

1. A hydraulic arrangement comprising a hydraulic multi-line hose, a hydraulic coupling device, and a hydraulic connecting device interconnecting the multi-line hose and the coupling device, the multi-line hose having a plurality of flexible hydraulic conduits housed within a protective sheath, the coupling device having a plurality of plug pins held within a casing by a retainer, and the connecting device comprising a first sleeve, a second sleeve having an end portion telescopically positioned around an inturned end portion of the first sleeve, and a releasable securing element for detachably connecting said end portions of the sleeves, the other end portion of the first sleeve being connected to the multi-line hose, and the other end portion of the second sleeve being connected to the coupling device, wherein the securing element is such as to permit relative rotation between the two sleeves and such as to resist tensile forces tending to separate the two sleeves, wherein the outer diameters of the first and second sleeves are substantially no greater that the outer diameter of the hose, wherein said end portions of the sleeves have a greater wall-thickness than the remaining portions thereof, and wherein the second sleeve has an axially-extending recess of limited circumferential extent formed in its inner wall extending from the other end portion to adjacent the first sleeve for accommodating a flange of a larger guide plug pin.

2. An arrangement according to claim 1, wherein the securing element is a wire collar which engages in a groove formed by complementary recesses formed in the telescoped end portions of the sleeves.

3. An arrangement according to claim 2, wherein one of the sleeves is provided with an aperture which is tangential to, and contiguous with, the recess in that sleeve.

4. An arrangement according to claim 1, wherein the first sleeve is a clamping sleeve which is press-fitted over the end portion of the protective sheath of the multi-line hose.

5. An arrangement according to claim 1, wherein said end portion of the first sleeve extends beyond the protective sheath of the multi-line hose.

6. An arrangement according to claim 1, wherein said other end portion of the second sleeve is positioned in a recess formed in the casing of the coupling device, and wherein said other end portion of the second sleeve is provided with an outwardly-extending flange which bears against the retainer, and is held thereagainst by an abutment member detachably fixed to the casing.

7. An arrangement according to claim 6, wherein the abutment member is a circlip.

* * * * *